United States Patent [19]

Ueda

[11] Patent Number: 5,706,056
[45] Date of Patent: Jan. 6, 1998

[54] SIGNAL PROCESSING APPARATUS FOR USE WITH A DIGITAL VIDEO TAPE RECORDER

[75] Inventor: Mamoru Ueda, Kanagawa, Japan

[73] Assignee: Sony Corporation, Tokyo, Japan

[21] Appl. No.: 347,329

[22] PCT Filed: Mar. 29, 1994

[86] PCT No.: PCT/JP94/00503

§ 371 Date: Mar. 13, 1995

§ 102(e) Date: Mar. 13, 1995

[87] PCT Pub. No.: WO94/23534

PCT Pub. Date: Oct. 13, 1994

[30] Foreign Application Priority Data

Mar. 31, 1993 [JP] Japan .................... 5-096851

[51] Int. Cl.[6] .................... H04N 7/18
[52] U.S. Cl. .................... 348/420; 348/405; 348/421; 348/422
[58] Field of Search .................... 348/420, 474, 348/460, 464, 500, 421, 416, 405, 422; 358/335, 319

[56] References Cited

U.S. PATENT DOCUMENTS

| | | | |
|---|---|---|---|
| 5,146,324 | 9/1992 | Miller et al. | 358/133 |
| 5,194,964 | 3/1993 | Kawai | 358/316 |
| 5,204,744 | 4/1993 | Akiyama | 358/319 |
| 5,289,577 | 2/1994 | Gonzales et al. | 395/163 |
| 5,301,018 | 4/1994 | Smidth et al. | 348/420 |
| 5,448,298 | 9/1995 | Mimoto et al. | 348/420 |
| 5,473,385 | 12/1995 | Leske | 348/500 |

*Primary Examiner*—Tommy P. Chin
*Assistant Examiner*—Anand S. Rao
*Attorney, Agent, or Firm*—William S. Frommer; Alvin Sinderbrand

[57] ABSTRACT

In a signal processing apparatus having a plurality of signal processing circuits where predetermined data is to be output sequentially through the plurality of signal processing circuits, when signal processing is performed at each signal processing circuit, timing necessary for respective signal processing is added to the data to be transmitted, as a header information, so that a complicated construction, such that a circuit for obtaining timing necessary for signal processing is added at each signal processing circuit, can be avoided, and the data can be securely processed and delivered at each signal processing circuit.

4 Claims, 6 Drawing Sheets

SIGNAL PROCESSING APPARATUS FOR USE WITH A DIGITAL VIDEO TAPE RECORDER

DESCRIPTION

1. Technical Field

The present invention relates to a signal processing apparatus, and more particularly to an improvement of recording or reproducing apparatus for a digital video tape recorder (D-VTR) for discrete cosine transforming (DCT) video signal in order to compress amount of information thereof and recording it.

2. Background Art

Figure 1:
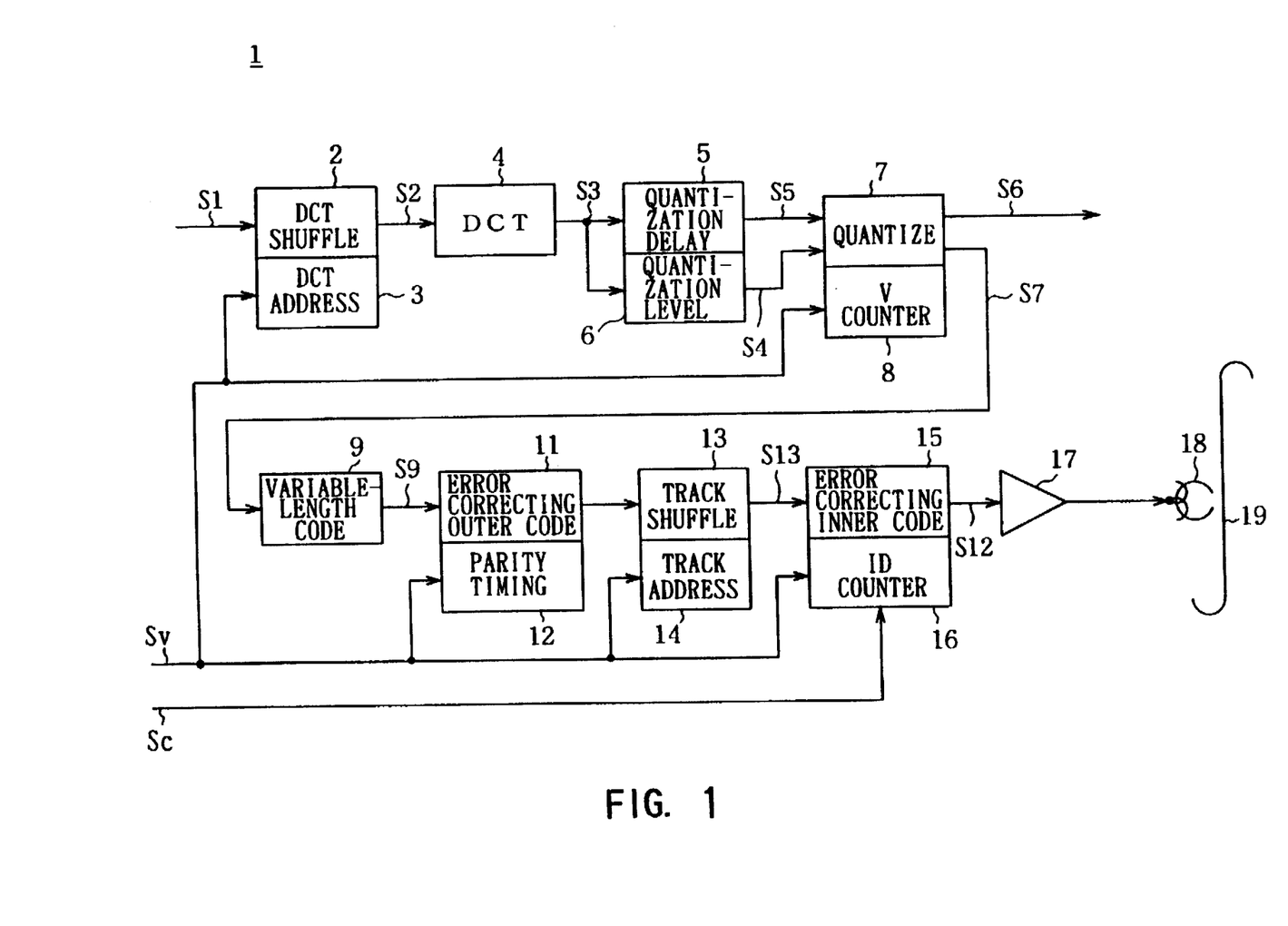
FIG. 1 is a block diagram showing the construction of a conventional recording and/or reproducing apparatus.
Figure 2A:
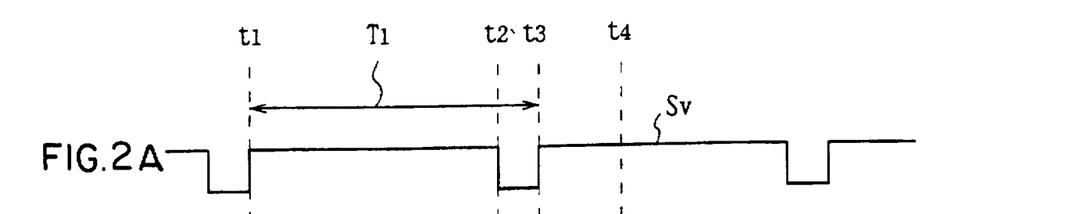

Heretofore, as this type of D-VTR, there is one shown in FIG. 1. In FIG. 1, 1 generally denotes the D-VTR. A digital video signal S1 (FIG. 2(B)) input from a predetermined video signal generating unit is input to a DCT shuffling circuit 2. The DCT shuffling circuit 2 has a DCT address circuit 3 in association therewith, a vertical synchronizing signal $S_V$ (FIG. 2(A)) is input to the DCT address circuit 3.

Accordingly, the DCT shuffling circuit 2 divides the digital video signal S1 into DCT blocks of 8 columns×4 rows for each one field by shuffle address generated by the DCT address circuit 3 on the basis of the vertical synchronizing signal $S_V$. The DCT shuffling circuit 2 collects 10 blocks of the DCT blocks from their respective positions discretely located from each other within a screen to generate shuffle data S2 (FIG. 2(C)), and outputs the shuffle data S2 to the following DCT conversion circuit 4.

Figures 2B, 2C:
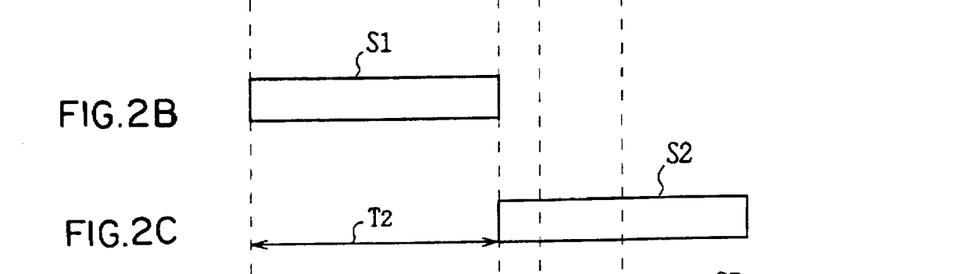

Here, the DCT shuffling circuit 2 performs shuffling processing by each one field. Thereby, the shuffle data S2 output from the DCT shuffling circuit 2 is supplied to the DCT conversion circuit 4 at a timing delayed by one field time period T2 from the digital video signal S1 as shown in FIG. 2(C).

Figures 2D, 2E:
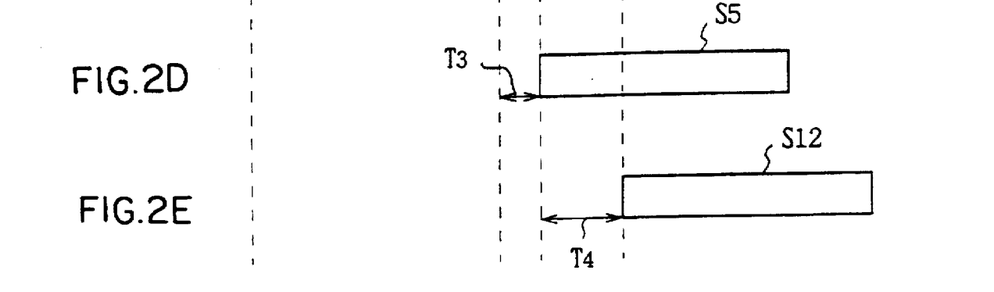

The DCT conversion circuit 4 performs discrete cosine transform to data of each DCT block and supplies DCT data S3 to a quantization delay circuit 5 and a quantization level detecting circuit 6. The quantization level detecting circuit 6 detects a quantization level (quantization width) for achieving a target compression rate for the DCT data S3. Since, at this time, about ten-block time period is required as the signal processing time in the quantization level detecting circuit 6, the quantization delay circuit 5 delays the DCT data S3 by the signal processing time, and supplies it to a quantization circuit 7 as a quantization delay output data S5. Accordingly, the quantization delay output data S5 is input to the quantization circuit 7 at the same timing as quantization level data S4 which is output from the quantization level detecting circuit 6 at a time point t3 delayed by a 10-block time period T3 from the shuffle data S2 as shown in FIG. 2(D).

The quantization circuit 7 quantizes the quantization delay output data S5 supplied from the quantization delay circuit 5 based on the quantization level data S4 supplied from the quantization level detecting circuit 6 in order to compress amount of information thereof. At this time, the quantization circuit 7 detects a maximum value, a minimum value, and a mean value etc., of quantization level within one field, on the basis of a period signal for each one field obtained from the vertical synchronizing signal $S_V$ at a vertical counter 8 provided in association therewith, and outputs the result as detection data S6 to a quantization monitor (not shown) to monitor the state of compression of data at the quantization circuit 7.

Further, quantization data S7 obtained from the quantization circuit 7 is supplied to a variable-length coding circuit 9. The variable-length coding circuit 9 performs variable-length coding to the quantization data S7 to generate variable-length coding data S9 having a block length prescribed in a format, and outputs it to an error correcting outer coding circuit 11.

The error correcting outer coding circuit 11 generates an error correcting outer code for correcting an error occurred in the manner of a burst, on the basis of a timing obtained from the vertical synchronizing signal $S_V$ at a parity timing circuit 12 which is provided in association therewith, and the result is added to the variable-length coding data S9 and is output to a track shuffling circuit 13.

The track shuffling circuit 13 generates track shuffle data S13 by recording the data into an order suitable for the track pattern on a magnetic tape, in accordance with shuffle address obtained from the vertical synchronizing signal $S_V$ at a track address circuit 14 which is provided in association therewith.

The track shuffle data S13 is supplied to an error correcting inner coding circuit 15. The error correcting inner coding circuit 15 generates an error correcting inner code for correcting random error and adds to the track shuffle data S13. An ID counter 16 which is provided in association with the error correcting inner coding circuit 15, obtains a block number obtained from the vertical synchronizing signal $S_V$ and the color field signal $S_C$, and color field information corresponding to a time period when the phase shift of carrier resulting from phase shifts by each scanning line completes a cycle.

The error correcting inner coding circuit 15 adds the block number and the color field information to the track shuffle data S13 as ID information, and outputs the result to a recording circuit 17 as recording data S12. The recording circuit 17 converts the recording data S12 from an 8 [bit] parallel form to to 1 [bit] serial form and effects channel coding suitable for magnetic recording, and records on a magnetic tape 19 by means of a magnetic head 18 provided on a rotary drum.

Here, since the track shuffling circuit 13 performs re-ordering processing of data by each ⅓ field, the recording data S12 obtained on the basis of the track shuffle data S13 is output from the error correcting inner coding circuit 15 at a time point t4 delayed by ⅓ field period T4 from quantization delay output data S5 output from the quantization delay circuit 5 as shown in FIG. 2(E).

Here, in the recording data S12 in the D-VTR 1, a synchronizing pattern is added to the beginning of a data block as a delimiter for the block and a delimiter for restoring data recorded in 1 [bit] serial form on the magnetic tape into the original 8 [bit] parallel form.

Further, a block number for indicating the sequential order of each data block is added as ID information at the error correcting inner coding circuit 15, so that an image is reproduced even when data blocks are not continuously reproduced as the reproducing head helically scans a plurality of tracks in double-speed reproducing etc. Furthermore, color field information is also added as ID information at the error correcting inner coding circuit 15.

Further, video data generated through the above DCT shuffling circuit 2 to the error correcting inner coding circuit 15 is recorded subsequently to the ID information. At the beginning of the video data, the quantization level information in data compression is added at the quantization circuit 7 in accordance with the quantization level data S4.

Furthermore, an inner parity data for correcting a random error is added at the error correcting inner coding circuit 15.

In the D-VTR 1 of such construction, data is output with a delay of the time necessary for the signal processing at each signal processing circuit. For example, at the DCT shuffling circuit 2, data is output with a delay corresponding to one field time period T2 (FIG. 2(C)), and at the quantization delay circuit 5, data is delayed by 10-block time period T3 (FIG. 2(D)). Further, at the DCT conversion circuit 4, the quantization circuit 7, and the variable-length coding circuit 9, data is delayed by about one block time period respectively, and at the track shuffling circuit 13, data is delayed by ⅓ field time period T4 (FIG. 2(E)).

Accordingly, at the timing circuits of the vertical counter 8, the parity timing circuit 12, the track address circuit 14, and the ID counter 16, timing signals must be generated with their phase conforming to their respective delay time from the vertical synchronizing signal $S_V$.

Further, while the color field information is input at the same timing as the digital video signal S1, data (track shuffle data S13) input to the error correcting inner coding circuit 15 to which the color field information is to be added as ID information is delayed by about 1.4 field from the input point t1 (FIGS. 2(A) to 2(E)) of the digital video signal S1. Accordingly, a latch circuit for reading the color field information with a delay corresponding to such delay time is necessary at the ID counter 16, resulting in a problem of complicating the construction.

Further, all of these delay phases occur as an accumulation of processing time in the signal processing circuits up to the previous stage of that point and, when processing time of a signal processing circuit is changed in its development process, timing of all the signal processing circuits after the changed signal processing circuit must be corrected in accordance with such changed time period.

DISCLOSURE OF INVENTION

Considering the above points, the present invention provides a signal processing apparatus such that, data to be output with a delay at each signal processing circuit can securely be processed and delivered irrespective of delay time of the data due to the signal processing time of the respective signal processing circuit.

To solve such problems according to the present invention, a signal processing apparatus having a plurality of signal processing circuits which are sequentially connected so as to make a desired data into a predetermined unit and sequentially perform signal processing, at least one of which performs a predetermined signal processing to the desired data at the timing determined on the basis of a processing timing of the another signal processing circuits, wherein at least one of signal processing circuits outputs the desired data with adding timing data indicating the processing timing. The another signal processing circuits set the timing of signal processing for the desired data on the basis of the timing data.

Further, in the present invention, a signal processing apparatus having a plurality of signal processing circuits which are sequentially connected so as to make video data into a predetermined unit and sequentially perform signal processing, at least one of which performs predetermined signal processing to the video data at the timing determined on the basis of a processing timing of the another signal processing circuits, wherein at least one of signal processing circuits outputs the video data with adding timing data indicating the processing timing. The another signal processing circuits set the timing of signal processing for the video data on the basis of the timing data.

Further, in the present invention, a signal processing apparatus 20 for digital video signal for performing a predetermined signal processing for digital video signal S1, comprising: a block shuffling circuit 21 for making input digital video signal S1 into a predetermined unit in order to perform a block conversion coding and shuffling it to obtain shuffle data S21, and then for outputting the shuffle data S21 with adding a block number information $D_{BL}$ and a color field information $D_{FI}$ of the digital video signal S1 as header data; a block conversion coding circuit 23 receiving the output of the block shuffling circuit 21 for performing block conversion coding for the shuffle data S21 and obtain coding data S22, and for outputting the coded data S22 with adding the header data; a quantization circuit 25 receiving the output of the block conversion coding circuit 23 for quantizing the coding data S22 and obtain quantized data S25, and for outputting the quantized data S25 with adding the header data to which quantization level information $D_Q$ in quantizing is added to the quantized data S25; a variable-length coding circuit 26 receiving the output of the quantization circuit 25 for processing variable-length coding to the quantized data S25 to obtain variable-length coded data S26, and for outputting the variable-length coded data S26 with adding the header data; an error correcting outer coding circuit 27 receiving the output of the variable-length coding circuit 26 for generating error correcting coding data in accordance with the block number information $D_{BL}$, and for outputting the error correcting coding data with adding the output of the variable-length coding circuit 26; a shuffling circuit 28 receiving the output of the error correcting outer coding circuit 27 for shuffling the variable-length coded data in accordance with the block number information $D_{BL}$, and for outputting the shuffle data with adding the header data to obtain shuffle data S28, and for outputting the shuffle data S28 with adding the header data; and an error correcting inner coding circuit 29 receiving the output of the shuffling circuit 28 for generating an error correcting inner code data in accordance with the block number information $D_{BL}$ and the color field information $D_{FI}$, and for outputting the error correcting inner code data with adding the output of the shuffling circuit 28.

When the desired data S1 is output sequentially through each of the signal processing circuits 21 to 29, timing data $D_{FI}$, $D_{BL}$, and/or $D_Q$ are/is added to the data S1 and processing at each signal processing circuit 21 to 29 is performed at a timing based on the timing data $D_{FI}$, $D_{BL}$, and/or $D_Q$, so that the data S1 can be delivered between the signal processing circuits 21 to 29 without regard to processing time in the respective signal processing circuits 21 to 29.

BRIEF DESCRIPTION OF DRAWINGS

FIGS. 2(A) to 2(E) are signal waveform diagrams explaining delayed state of data due to the signal processing;

FIGS. 7(A) to 7(C) are schematic diagrams explaining data arrangement being used in the recording and/or reproducing apparatus.

BEST MODE FOR CARRYING OUT THE INVENTION

Figure 3:
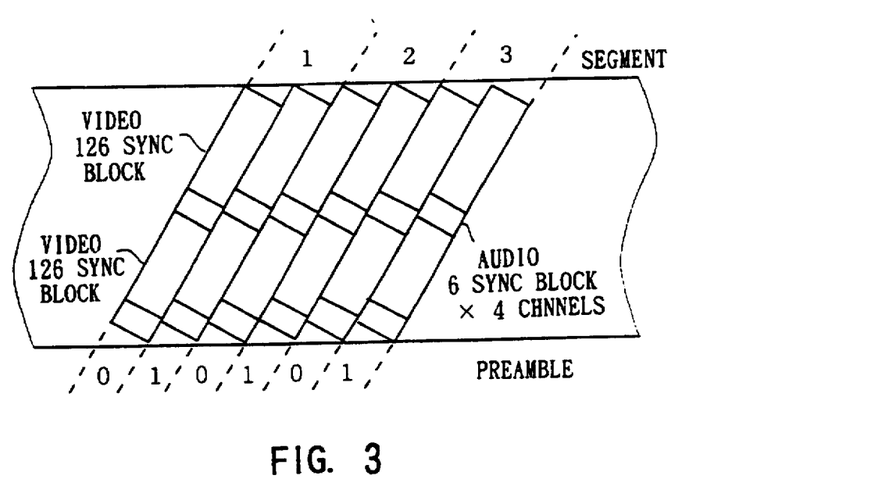
FIG. 3 is a schematic diagram explaining a recording format in recording and/or reproducing by a recording and/or reproducing apparatus according to the present invention.

An embodiment of the present invention will be described in detail, with the accompanying drawings:

FIG. 3 shows a recording format on a magnetic tape which is recorded by a D-VTR according to the present invention. Digital video signal and digital audio signal for one field are made into a predetermined unit and recorded in the area of six helical recording tracks. The six recording tracks are segmented by two recording tracks and at each of which the segment number 1, 2, 3 are sequentially allocated from the head of one field.

Further, the track number 0 or 1 is allocated to the two recording tracks of respective segment. In one recording track, a preamble, video data of 126 sync blocks, audio data of 6 sync blocks×4 channels, and another video data of 126 sync blocks are sequentially recorded.

Figure 4:
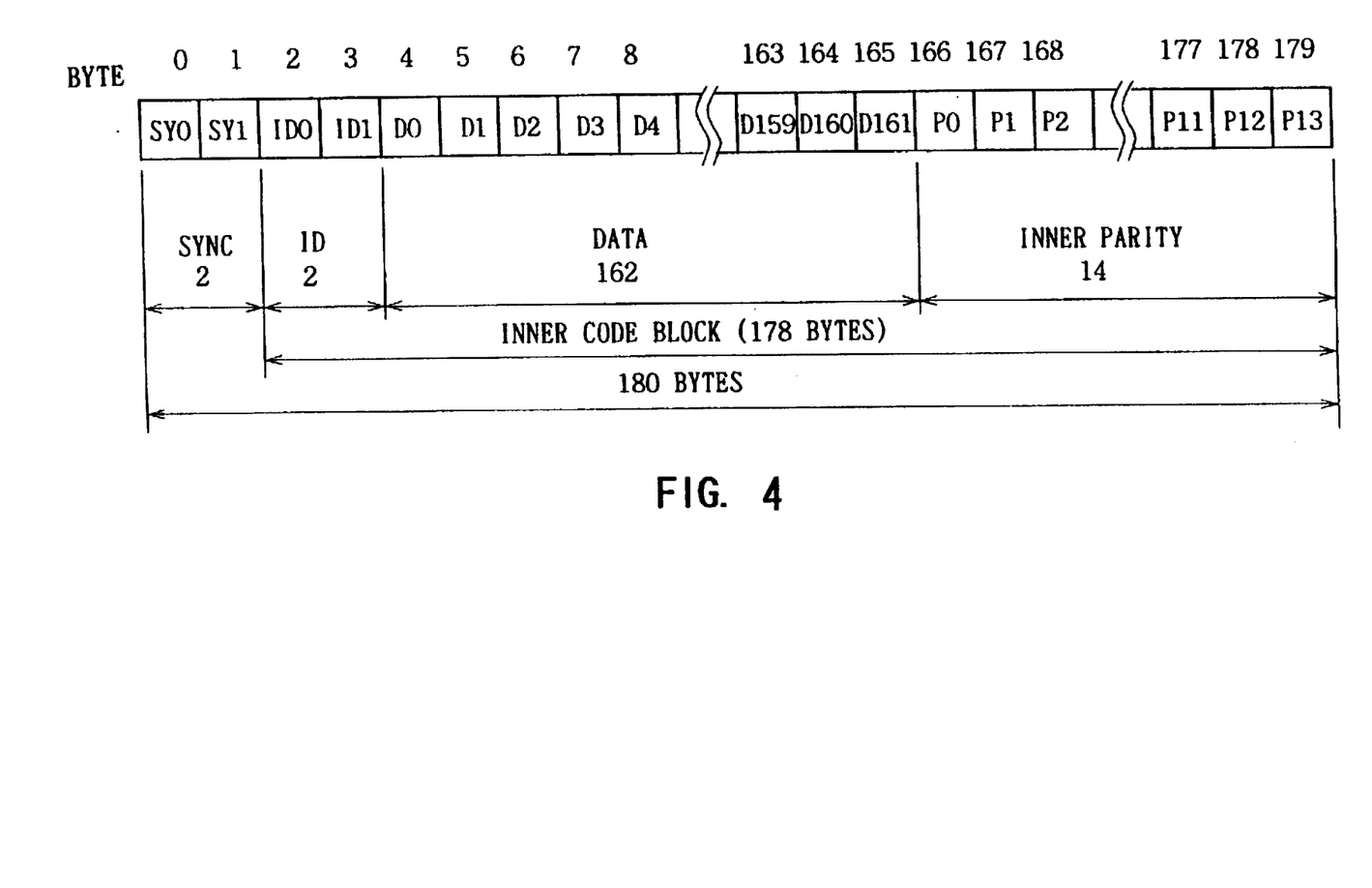
FIG. 4 is a schematic diagram explaining the structure of the sync blocks.

Here, as shown in FIG. 4, each sync block is 180-byte length, in which at the beginning 2 bytes, a synchronization pattern SYNC is recorded, at the succeeding 2 bytes, an identification pattern ID is recorded, at the succeeding 162 bytes, compressed video data, audio data, or these error correcting outer code parity is recorded as a recording data DATA, and at the end 14 bytes, an error correcting inner code parity IP of the identification pattern ID or recording data DATA is recorded.

Figure 5A:
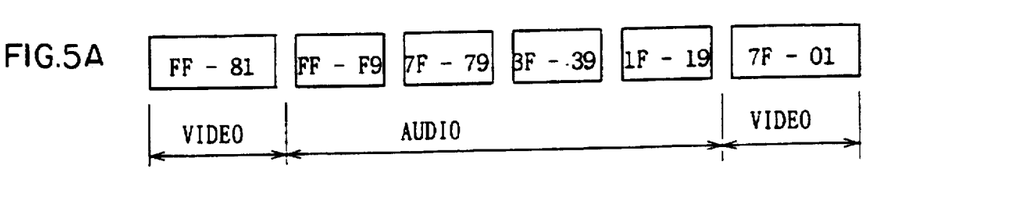
FIGS. 5(A) and 5(B) are schematic diagrams explaining contents recorded in the identification pattern of the sync blocks.
Figure 5B:
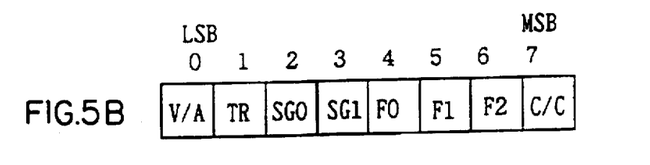

Practically, in the synchronization pattern SYNC, for example, the value "2ED3(H)" is recorded as a fixed pattern. At the beginning one byte, corresponding numbers of sync block are recorded as the identification pattern ID in the sequence of FIG. 5(A). Further, at the succeeding one byte, flag information indicating the property of corresponding sync block is recorded as an identification pattern ID by sector numbers as shown in FIG. 5(B).

That is, when being the value "1", bit 0 of the LSB in this byte indicates the sector of video data, and when being the value "0", which is an identification flag indicating the sector of audio data. At the bit 1, the value "0" or "1" is recorded as a track number in the above segment number. At the bits 2 and 3, the value "1", "2", or "3" of the above segment number is recorded in 2 bits. At the bits 4, 5, and 6, a color field information is recorded. The bit 7 of the MSB indicates a format of the digital video data, and when being component video data, the value "1" is recorded, and when being composite video data, the value "0" is recorded.

Figure 6:
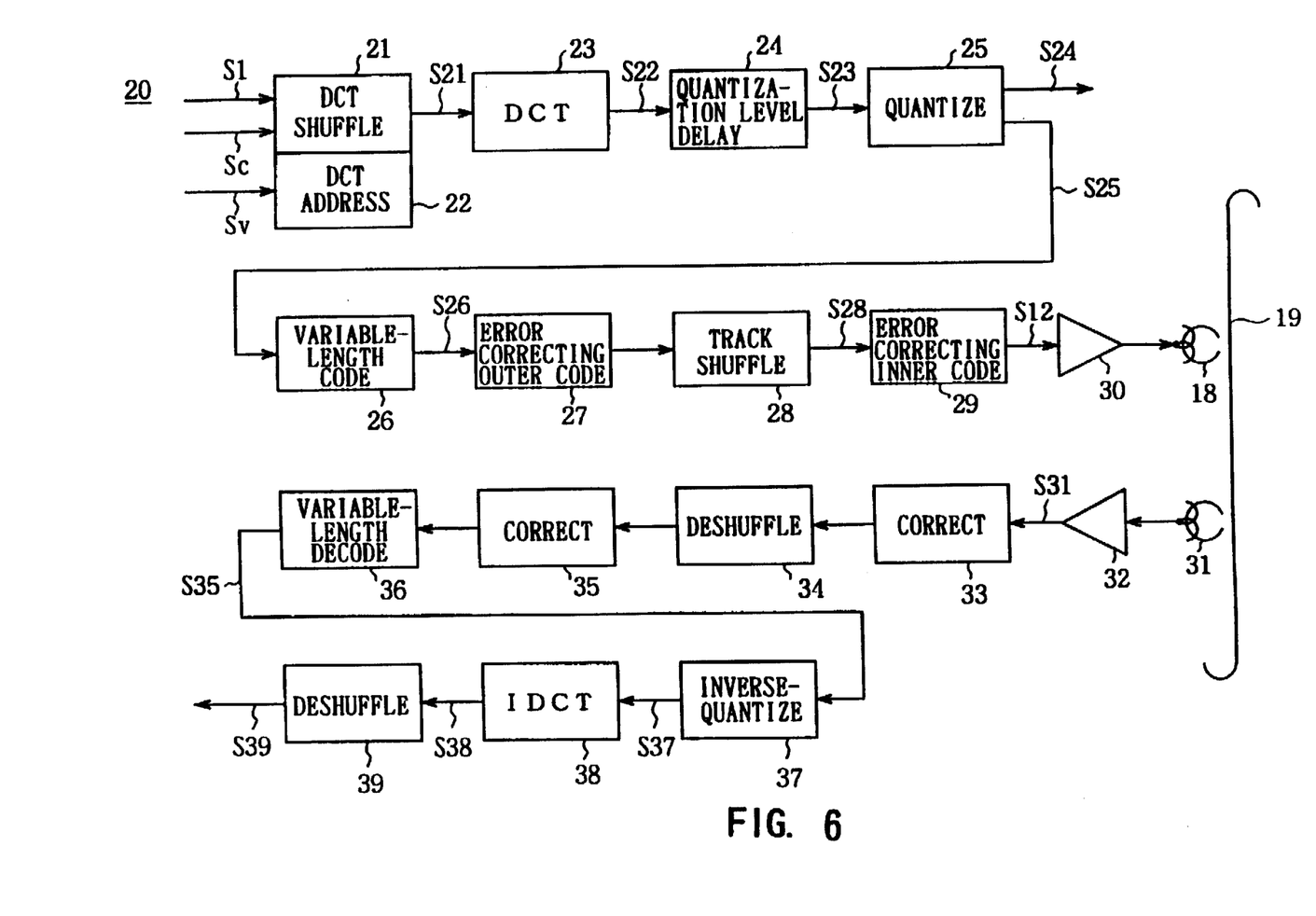
FIG. 6 is a block diagram showing the construction of an embodiment of recording and/or reproducing apparatus according to the present invention.

In the D-VTR 20 shown in FIG. 6, the corresponding part to FIG. 1 is denoted by the same numerals. A DCT address circuit 22 generates a shuffle address on the basis of the vertical synchronization signal $S_V$, and a DCT shuffling circuit 21 shuffles digital video signal S1 in accordance with the shuffle address to generate shuffle data S21, and supplies it to a DCT circuit 23.

Figure 7A:
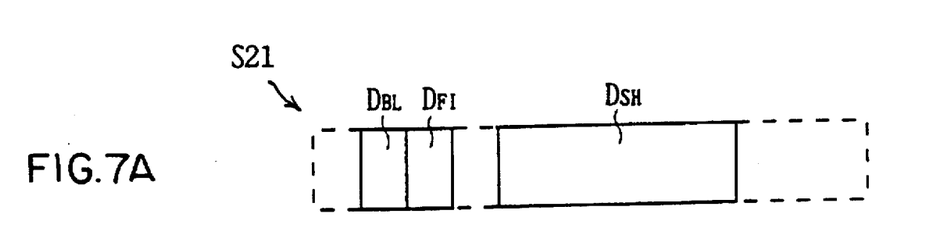

At this time, as shown in FIG. 7(A), the DCT shuffling circuit 21 adds a block number $D_{BL}$ generated by the DCT address circuit 22 and a color field information $D_{FI}$ to DCT block data $D_{SH}$ as header information. Here, the block number $D_{BL}$ corresponds to the total of the sync block number of the first byte in the identification pattern ID which has been described accompanying with FIGS. 4 and 5(A) and 5(B), the data identification flag, the segment number, and the track number of the bits 0 to 3 of the second byte, and the color field information $D_{FI}$ corresponds to the color field information of the bits 4 to 6 of the second byte.

The DCT transformation circuit 23 performs discrete cosine transformation for respective DCT block data $D_{SH}$ on the basis of the block number $D_{BL}$ and color field information $D_{FI}$, and supplies the result as DCT data S22 to a quantization level delay circuit 24. The quantization level delay circuit 24 detects a quantization level for determining a quantized width at the following quantization circuit 25 while delaying the DCT data S22, and as shown in FIG. 7(B), outputs the DCT data $D_{DCT}$ to a quantization circuit 25 as quantization level delay output data S23 with thus detected quantization level information $D_Q$ added as a header information.

The quantization circuit 25 quantizes the DCT data $D_{DCT}$ on the basis of the quantization level information $D_Q$ added as a header information in order to compress. At this time, the head and end of the field are investigated by the block number $D_{BL}$ added as a header information to calculate the mean value of the quantization levels, etc., the calculated result S24 is output to a quantization monitor (not shown), so that the compressed state can be monitored.

Further, in the quantization circuit 25, the compression-processed quantized data S25 is supplied to a variable-length coding circuit 26 to be variable-length coded. Thus obtained variable-length coded data S26 is supplied to an error correcting outer coding circuit 27.

Figure 7B:
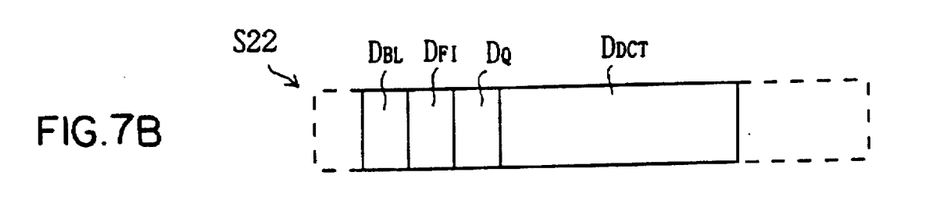

The error correcting outer coding circuit 27 generates a parity timing from the block number $D_{BL}$ (FIGS. 7(A) and 7(B)) which is in association with the variable-length coded data S26 as a header information to generate an error correcting outer code. Further, the following track shuffling circuit 28 also generates a shuffle address from the block number $D_{BL}$ (FIGS. 7(A) and 7(B)) which is in association with the variable-length coded data S26 in order to re-order the data, and sends it to the following error correcting inner coding circuit 29 as track shuffle data S28.

Figure 7C:
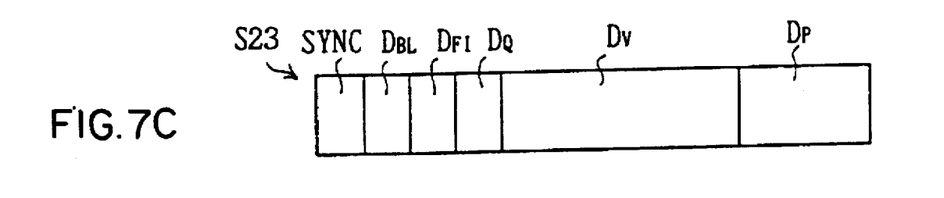

The error correcting inner coding circuit 29 generates an error correcting inner code, and adds the synchronization pattern SYNC to generate recording data S12 shown in FIG. 7(C). The recording data S12 is recorded on a magnetic tape 19 through the following recording circuit 30 and magnetic head 18. At this time, in the error correcting inner coding circuit 19, since the block number $D_{BL}$ and field information $D_{FI}$ which are necessary as ID information, are previously added to the data as header information, it is unnecessary to add those again.

Further, in the reproducing system, reproduced data S31 which is reproduced through a reproducing head 31 and reproducing circuit 32 is input to a correcting circuit 33 to be correction-processed by using the error correcting inner code recorded with the recording data, and is output to a de-shuffling circuit 34. The de-shuffling circuit 34 de-shuffles the reproduced data re-ordered to the sequence corresponding to the track pattern on the magnetic tape into the original sequence, and outputs it to the following correcting circuit 35 as de-shuffle data S34.

The correcting circuit 35 corrects an error in the manner of burst of the de-shuffle data S34 and outputs it to the following variable-length decoding circuit 36. The variable-length decoding circuit 36 obtains variable-length decoded data S35 from the de-shuffle data S34 and outputs it to an inverse-quantization circuit 37 to perform inverse-quantization processing. The inverse-quantization circuit 37 outputs thus obtained inverse-quantized data S37 to an IDCT circuit to perform inverse-transform processing for discrete cosine transformation at the DCT transforming circuit 23 described above. The IDCT circuit outputs thus obtained IDCT data S38 to the following de-shuffling circuit 39 to re-order the DCT-blocked data in the sequence of scanning, and outputs it as reproducing digital video signal S39.

In the above configuration, the D-VTR 20 adds the block number $D_{BL}$ and field number $D_{FI}$ to the digital video signal S1 as header information at the DCT shuffling circuit 21, and further adds the quantization level information $D_Q$ as a header information at the quantization level delay circuit 24. By using the header information, information necessary for the signal processing can be obtained from only input data at each signal processing circuit, further the information is input at the same timing as the processing data.

The header information is used as a timing information at each signal processing circuit, and signal processing is performed in accordance with the timing of the above header information, so that in each signal processing circuit, signal processing can be performed at the securely timing without regard to the processing delay time of signal processing circuits connected to the previous stage or latter stage. Therefore, in each signal processing circuit, a counter circuit for generating timing in respective signal processing, a latch circuit for timing phases by delaying the information, etc. can be omitted.

Further, the color field information $D_{FI}$ is added as a header information, so that the color field information $D_{FI}$ is delayed with the data at each signal processing circuit and transmitted to the last recording data S12. Further, also the quantization level information $D_Q$ detected at the quantization level delay circuit 24 is added to the data as a header information, so that at the quantization circuit 25 of next stage, the quantizing operation can be executed by investigating a quantization level from the header information.

In such a manner, new information is added as a header information at the signal processing circuit of halfway, so that the signal connection between complicated circuits such as the conventional D-VTR 1 described above with FIG. 1, in which the quantization level detecting data S4 is output from the quantization level detecting circuit 6 to the quantization circuit 7 separated from the quantization delay output data S5, can be reduced, and transmitting the data to a latter stage of the signal processing circuit without regard to delay time at each signal processing circuit.

As the above configuration, when performing signal processing at each signal processing circuit, the timing necessary for respective signal processing is added for the data to be transmitted, as a header information, so that each signal processing circuit can be avoided to be complicated structure such that a circuit for obtaining the timing necessary for the signal processing is added at the respective signal processing circuits.

Further, in each signal processing circuit, the signal processing can be performed without generating a timing necessary for the signal processing at the respective signal processing circuits, so that the signal processing circuit can be developed Without regard to delay time at each signal processing circuit. Therefore, even if processing time of each signal processing circuit is changed in its development process, the signal processing circuit provided to a latter stage of the above signal processing circuit may not be changed in accordance with the such changed time period, so can be developed more easily.

Note that, in the embodiment described above, it has been described the case where the present invention is being applied to a D-VTR. However, the present invention is not only limited to this, but is widely applicable to a signal processing apparatus such that data is transmitted via a plurality of signal processing circuits.

INDUSTRIAL APPLICABILITY

The present invention is being suitable to apply to a signal processing apparatus, for example, being a recording or reproducing apparatus for digital video tape recorder (DVTR) for discrete cosine transforming video signal in order to compress amount of information thereof and record.

I claim:

1. A signal processing apparatus for digital video signal for performing a predetermined signal processing for digital video signal, comprising:

a block shuffling circuit for making input digital video signal into a predetermined unit in order to perform a block conversion coding and shuffle it to obtain a shuffle data, and then for outputting said shuffle data with adding a block number information and color field information of said digital video signal as header data;

a block conversion coding circuit receiving the output of the block shuffling circuit for performing block conversion coding for said shuffle data to obtain coded data, and for outputting said coded data with adding said header data;

a quantization circuit receiving the output of the block conversion coding circuit for quantizing said coded data to obtain quantized data, and for outputting said quantized data with adding said header data to which quantization level information in quantizing is added;

a variable-length coding circuit receiving the output of the quantization circuit for processing variable-length coding to said quantized data to obtain variable-length coded data, and for outputting said variable-length coded data with adding said header data; and an error correcting outer coding circuit receiving the output of the variable-length coding circuit for generating error correcting coding data in accordance with said block number information, and for outputting said error correcting coding data with adding the output of said variable-length coding circuit.

2. The signal processing apparatus according to claim 1 further comprising, a shuffling circuit receiving the output of said error correcting outer coding circuit for shuffling said variable-length coded data in accordance with said block number information to obtain shuffle data, and for outputting said shuffle data with adding said header data.

3. The signal processing apparatus according to claim 2 further comprising, an error correcting inner coding circuit receiving the output of said shuffling circuit for generating an error correcting inner code data in accordance with said block number information and said color field information, and for outputting said error correcting inner code data with adding the output of said shuffling circuit.

4. The signal processing apparatus according to claim 1, wherein said block conversion coding is performed by a method of discrete cosine transform.

* * * * *